April 23, 1929.  A. J. CAWLEY  1,710,677

PICTURE NEGATIVE

Original Filed Oct. 3, 1919

INVENTOR

Aloysius J. Cawley

Patented Apr. 23, 1929.

1,710,677

UNITED STATES PATENT OFFICE.

ALOYSIUS J. CAWLEY, OF PITTSTON, PENNSYLVANIA.

PICTURE NEGATIVE.

Original application filed October 3, 1919, Serial No. 328,299. Divided and this application filed August 2, 1926. Serial No. 126,648.

This application is a division of my application for a process of laterally modifying a sound record, Serial Number 328,299, filed October 3, 1919, which covered a process of photographically magnifying sound records, preferably those produced on motion picture films, being a complete record of the movements and sounds of persons or objects. By the above process, the length of the sound record was not altered in the least.

Either from the laterally enlarged sound record, or from an unaltered original sound record groove, a linear ribbon-like patrix was made by passing the record through the interval between rolls while in contact with a suitable soft metal strip, and applying suitable pressure. The patrix could also be produced by electrochemical means. This patrix was cemented to the margin of the original negative motion picture film, thus forming a complete talking picture negative record, from which thousands of duplicates could be made in a very short time.

This talking picture negative was run through a combined motion picture printer and sound record molder, producing thereby any number of finished talking picture positives, i. e., motion picture films bearing preferably on their margins, their own synchronous sound records.

In either imprinting a mechanical groove record on a motion picture film, thus forming its sound record, or in reproducing one of the complete talking picture positives, consisting of a photographic picture record and its corresponding synchronous sound record, as mentioned in the last paragraph, a special type of motion picture sprocket wheel, having a portion of its structure made of sound record backing material was used. This constituted a veritable phonographic cylindrical record, which is capable of the most faithful reproduction.

For a more complete understanding of the invention, reference is to be had to the following descriptions and claims taken in connection with the accompanying drawings, which illustrate certain embodiments of the invention, and wherein similar reference characters are employed to designate corresponding parts.

Figure 1:
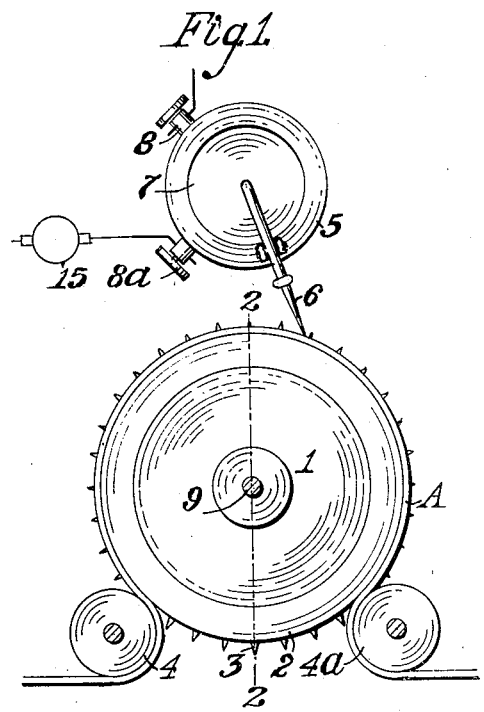
Figure 1 is an end view of the specially designed sprocket wheel, which is intended to accomplish a more perfect recording or reproducing of sound records of the mechanical groove type on motion picture films.
Figure 2:
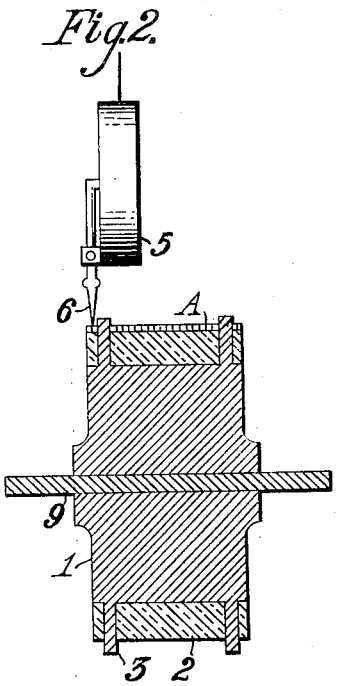
Figure 2 is a cross-sectional view of the sprocket wheel on the line 2—2, the reproducer not being shown itself in cross-section.

In the recording or reproducing of sound records in practice, it is highly desirable that the film should be held perfectly rigid while moving at an absolutely uniform rate of speed. Figure 1 is an end view of a device, which may form a part of the camera or projector, and intended to accomplish this object.

It illustrates a motion picture film upon which has been impressed a sound record groove of the synchronized sounds of the objects photographed on the film, passing through the projector and engaged by a stylus which is attached to the diaphragm of a microphone in order to impress the fluctuations corresponding to the sound record upon the electric current which traverses the microphone. This current in turn operates a loud speaking telephone located behind the projection screen. The projector is not shown in its entirety, but in accordance with the rules of the office, only the part of the projector with which the stylus cooperates, and which is here shown as the sprocket wheel adjacent the projector film gate. Obviously, a specially designed reproducer sprocket may be inserted at any part of the projector mechanism desired. This sprocket wheel is mounted on shaft 9 of the projector. The positive film A is held in firm contact with this sprocket wheel 1, which is provided with a resilient ring 2. This may be made of hard rubber, which in turn may be coated with a rubber paint on its surface. It may be also made of any phonographic record backing material, or, it may be made of any of the following substances: ebonite, wax, shellac, paper or earthy composition.

Two rings extend upward from the steel body of the sprocket wheel through this ring, or cushion, to form a base for the sprocket teeth. When the film is passed around this wheel and its perforations properly engaged with the sprocket teeth, the whole constitutes almost the exact equivalent of a cylindrical phonographic record on its mandrel. Thus the unsatisfactory reproduction from the frail film alone is done away with. The stylus, shown at 6, and the reproducer, which is shown as a microphone 7, are contained in the sound box 5. The electric power is shown as being supplied by 15, which may be a direct current dynamo, or storage battery, as it is desired to obtain a loud, powerful, reproduction. The wires from binding posts 8 and 8ª lead to a loud speaking telephone receiver located near or behind the picture screen. An induction coil may be included in the circuit which contains vacuum tube amplifying circuits, in order to increase the sound intensity. The contact rolls 4 and 4ª hold the film in contact. This type of sprocket wheel is intended for either recording or reproducing of sounds.

After printing the picture record and impressing the sound record from the patrix in one operation by means of the device described in the above mentioned application, I have produced a positive motion picture or talking picture film.

The patrix may be made in any way desired. It may be made directly from a sound record groove; or a photosensitive strip, printed from the original photographic sound record may be subjected to different treatments so that either a ridge or a groove is produced. If the original record was a groove, a patrix may be made from it directly by means of pressure. For instance, a bichromated gelatine strip is treated with old water, causing a ridge to swell upon its surface. This may be hardened by chrome alum, tannic acid, formalin, alum, or similar substance. It may be used directly as a patrix.

If a silver haloid strip be used, the silver line may be built up chemically, so as to form a raised ridge, and this used directly as a patrix.

Figure 3:
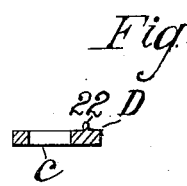
Figure 3 is a cross-sectional view of one of the several types of patrices which the invention covers.

The bichromated gelatine may be treated with warm water, and the unaltered material dissolved out, and a groove produced. If a silver haloid strip is used, the metallic silver of the record line is dissolved by chemical treatment, for instance with nitric acid. In either case, after thoroughly drying and hardening the strip, it is placed in contact with a ribbon of soft metal, such as lead, and pressure applied by rolls, or the like, and a metallic patrix D, Figure 3, having a ridge 22 is obtained. This patrix may be used to impress the sound record on the positive films. This patrix may be provided with sprocket holes to engage with the sprocket teeth. These holes are shown at c of Figure 3.

Figure 4:
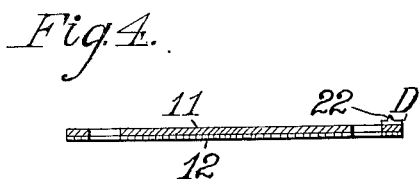
Figure 4 is a cross-sectional view of a negative motion picture film with its corresponding sound record patrix cemented to its margin. This greatly facilitates the simultaneous printing and impressing of picture and sound record respectively.

In practice, many positives are produced from the same negative. In order to facilitate this, and also to furnish convenience in handling and storing, and to avoid errors in printing sound and picture records in proper register, the patrix D is cemented to the negative film margin, as shown in Figure 4. The extreme utility of this is very apparent. Figure 4 illustrates the film 11 with its photographic record 12 and sound record patrix 22 formed on metallic strip D cemented to its margin. This constitutes what is literally a talking picture negative. Talking picture positives are made from it at the same speed that an ordinary motion picture film is printed by use of the combined picture printer and sound record molder described in the above mentioned application.

Having described my invention, I claim as new and desire to secure by Letters Patent.

1. A talking picture negative, consisting of a film bearing a negative photographic motion picture record and a patrix coextensive with said negative motion picture record and formed from a sound record which is a synchronized accompaniment of said picture record attached to said film capable of impressing the corresponding sound record.

2. A talking picture negative, consisting of a film bearing a negative photographic record of the movements of persons or objects, and a patrix coextensive with said negative photographic record and formed from a sound record which is a synchronized accompaniment of said picture record attached to said film capable of impressing the synchronous sound record of sounds emitted by said persons or objects.

3. A talking picture negative, consisting of a film bearing a negative photographic record of the movements of persons or objects, and a patrix coextensive with said negative photographic record and formed from a sound record which is a synchronized accompaniment of said picture record attached to said film capable of impressing a record of sounds emitted by said persons or objects, said records of movements and sounds being capable of synchronous reproduction.

Philadelphia, Pa., July 14, 1926.

ALOYSIUS J. CAWLEY.